United States Patent
Ai et al.

(10) Patent No.: US 11,714,047 B2
(45) Date of Patent: Aug. 1, 2023

(54) METHOD TO DETERMINE GAS ABSORPTION IN RAPIDLY TUNED DIODE LIDAR

(71) Applicant: QLM Technology Limited, Bristol (GB)

(72) Inventors: Xiao Ai, Bristol (GB); James Titchener, Bristol (GB)

(73) Assignee: QLM Technology Limited, Bristol (GB)

( * ) Notice: Subject to any disclaimer, the term of this patent is extended or adjusted under 35 U.S.C. 154(b) by 0 days.

(21) Appl. No.: 17/811,223

(22) Filed: Jul. 7, 2022

(65) Prior Publication Data

US 2022/0390361 A1 Dec. 8, 2022

Related U.S. Application Data

(63) Continuation of application No. 17/805,937, filed on Jun. 8, 2022, now abandoned.

(60) Provisional application No. 63/202,377, filed on Jun. 8, 2021.

(51) Int. Cl.
| | |
|---|---|
| *G01N 21/3504* | (2014.01) |
| *G01N 21/39* | (2006.01) |
| *G01S 17/88* | (2006.01) |
| *G01S 7/4911* | (2020.01) |

(52) U.S. Cl.
CPC ........ *G01N 21/3504* (2013.01); *G01N 21/39* (2013.01); *G01S 7/4911* (2013.01); *G01S 17/88* (2013.01); *G01N 2021/399* (2013.01)

(58) Field of Classification Search
CPC ........ G01N 2021/399; G01N 21/3504; G01N 21/39; G01S 17/88; G01S 7/4911
USPC .................................. 356/402–425, 432–444
See application file for complete search history.

(56) References Cited

U.S. PATENT DOCUMENTS

| | | | |
|---|---|---|---|
| 2015/0144297 A1* | 5/2015 | Toivonen | ............... G01N 21/49 356/73 |
| 2022/0390360 A1* | 12/2022 | Ai | .......................... G01S 7/4911 |

* cited by examiner

*Primary Examiner* — Tri T Ton
(74) *Attorney, Agent, or Firm* — Gerald W. Roberts; John V. Daniluck; Dentons Bingham Greenebaum LLP

(57) ABSTRACT

A method of measuring the concentration of a gas in a target environment using a laser lidar system, comprises directing a laser beam towards an environment containing the gas, tuning the laser wavelength over a wavelength range including the absorption line of the gas, and measuring intensity of laser light returned from the environment containing the gas, as a result of scattering as a function of time. The intensity vs time is then converted into gas absorption vs wavelength, and the gas absorption vs wavelength is used to determine the concentration of the gas in the target environment.

13 Claims, 8 Drawing Sheets

METHOD TO DETERMINE GAS ABSORPTION IN RAPIDLY TUNED DIODE LIDAR

CROSS-REFERENCE TO RELATED APPLICATIONS

The present application is a continuation of U.S. patent application Ser. No. 17/805,937, filed Jun. 8, 2022, which claims the benefit of priority of U.S. Provisional Patent Application No. 63/202,377, filed Jun. 8, 2021, all of which are incorporated herein by reference.

FIELD OF THE INVENTION

This invention relates to rapidly tunable diode lidar systems for determining gas concentrations.

BACKGROUND OF THE INVENTION

A lidar system transmits and then receives scattered laser light from the environment to determine range. In rapidly tunable diode lidar, for example as described in UK Patent Application Publication No. GB2586075A by J. Titchener and X. Ai, entitled "Rapidly tunable diode lidar" and published 3 Feb. 2021 ("GB2586075A"), the wavelength of the transmitted laser light is rapidly tuned allowing measurement of spectral transmission of the beam through the environment. The term "tune" or "tuning" or "tuned" is used to describe rapidly varying the laser wavelength over a range. In the case of gas detection the range is chosen to include the gas absorption line, i.e. a wavelength at which the gas absorbs the incident radiation.

A difficulty has been that in rapidly tuned diode lidar the laser wavelength is tuned rapidly such that the wavelength does not follow a smooth linear ramp with time, instead following a more complicated function. This has historically made spectroscopic gas concentration measurement difficult because the laser wavelength has not been known.

SUMMARY OF THE INVENTION

There is provided in the following systems, methods and computer readable media for measuring the concentration of a gas in a target environment using a laser lidar system. Generally, a laser beam may be directed towards an environment containing the gas and the laser wavelength tuned over a wavelength range including the absorption line of the gas. The intensity of laser light returned from the environment may be measured, as a result of scattering as a function of time, and converted into gas absorption vs wavelength. The gas absorption vs wavelength may then be used to determine the concentration of the gas in the target environment.

BRIEF DESCRIPTION OF DRAWINGS

Some embodiments of the invention will now be described by way of example only by reference to the accompanying drawings in which.

DETAILED DESCRIPTION OF THE INVENTION

Figure 1:
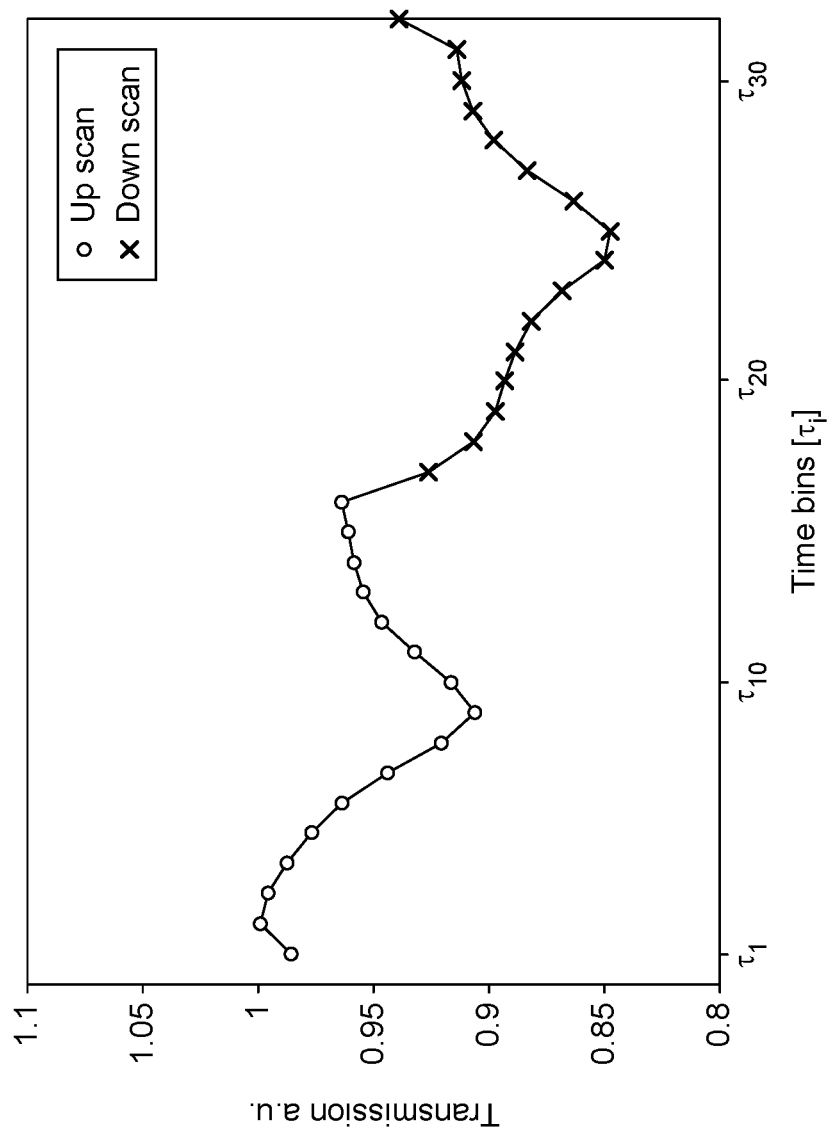
FIG. 1 is an example graph showing variation of transmission with time.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates. At least one embodiment of the present invention will be described and shown, and this application may show and/or describe other embodiments of the present invention, and further permits the reasonable and logical inference of still other embodiments as would be understood by persons of ordinary skill in the art.

It is understood that any reference to "the invention" is a reference to an embodiment of a family of inventions, with no single embodiment including an apparatus, process, or composition that should be included in all embodiments, unless otherwise stated. Further, although there may be discussion with regards to "advantages" provided by some embodiments of the present invention, it is understood that yet other embodiments may not include those same advantages, or may include yet different advantages. Any advantages described herein are not to be construed as limiting to any of the claims. The usage of words indicating preference, such as "various embodiments" or "preferably," refers to features and aspects that are present in at least one embodiment, but which are optional for some embodiments, it therefore being understood that use of the words "preferred" and/or "preferably" (and/or inflections thereof) implies the term "optional.". The invention is not limited to solutions to any of the problems described herein.

GB2586075A is incorporated herein by reference.

Some embodiments of the present invention use algorithms to match an observed line shape to an a priori known line shape, thus calibrating the laser wavelength versus time and allowing spectroscopic gas concentration measurement.

To detect a certain gas, the tuned spectral range is adjusted to overlap with an absorption line of that gas. Then a transmission 'dip', e.g. a dip in intensity, is observed in the return laser spectrum if the gas is present. The size of the dip indicates the quantity of gas in the laser path. The intensity of the returned laser light is inversely proportional to the absorption.

Typically, the signal measured by the discrete time domain rapidly tuned diode lidar can be described as $I(\tau_i)$. Here $\tau_i$ represents a specific discrete time bin in the periodic wavelength tuning cycle of the laser, and $I(\tau_i)$ is the intensity of transmitted light signal detected after the laser returns to the sensor.

In one embodiment the invention provides a method for converting the received digital time domain data $I_R(\tau_i)$ acquired from a rapidly tuned diode lidar system into a gas concentration measurement. The general method used to achieve this may comprise matching the absorption curve measured to a model of the expected absorption line shape of the gas.

The wavelength of the rapidly tuned laser is not known and does not follow a simple linear ramp as with slower modulated Wavelength Modulation Spectroscopy (WMS) systems. In other words, one does not immediately know $\lambda(\tau_i)$, the average wavelength emitted by the laser during a specific time bin $\tau_i$. The wavelength depends in a complex way on laser tuning cycle phase $\tau_i$, and the internal properties of the laser and the electronic or thermal driving method used to modulate the lasers wavelength. This presents a challenge because if the wavelength of the laser is not known wavelength spectroscopy is not possible.

For accurate gas concentration measurements it is desirable to convert the measured transmission vs laser tuning phase $I_R(\tau_i)$ into the typical transmission vs wavelength $I_R(\lambda_i)$. The technique may use prexisting knowledge of the shape of the gas absorption line to infer the exact wavelength of each discrete time bin in the spectral. The prexisting knowledge of the shape of the gas absorption line can be acquired through measurements in the lab, for example using HiTRAN (high-resolution transmission molecular absorption) data base, or approximations for standard lineshapes such as Lorentzian or Voigt lineshapes.

Some embodiments of the invention determine the tuning function to find the laser wavelength vs time. This function may then be applied to convert the raw data into transmission vs wavelength data, and determine the gas concentration.

The tuning function may be determined using complex lab equipment before deployment of the sensor. However, for some implementations it may be preferred to have algorithms that determine the tuning function automatically in the field.

Thus, a feature of some embodiments of the invention is a method to simultaneously determine the tuning function (laser wavelength vs time) and the gas absorption path length, or gas concentration pathlength. This allows highly accurate absorption spectroscopy even with unknown laser wavelength tuning vs time.

'Gas concentration path length' is the integral of the gas concentration along the total path travelled by the laser beam. In the case of a lidar system that path may be defined as starting at the lidar device, e.g. transceiver system, and ending at the scattering surface that returns the laser light, so is a single pass measurement. In the case of a background ambient gas that has uniform concentration along the entire path the integral becomes the simple product of the gas concentration, for example in molecules per unit length, times the path length.

Calibrating the wavelength axis of the spectrometer 'on the fly', which is used in some but not necessarily all embodiments of the invention, is a departure from usual calibration techniques. The usual concept of a spectrometer is to probe the sample with a set of a-priori known wavelengths and record the resulting spectrum. The idea that accurate spectroscopy can be carried out without exact prior knowledge of the wavelength is counterintuitive. In some embodiments of the invention a different type of prior information (namely the expected gas absorption line shape) is exploited to compensate for the lack of concrete information about the laser wavelength.

One embodiment provides a method of measuring the concentration of a gas in a target environment using a laser lidar system, the method comprising:
directing a laser beam towards an environment containing the gas,
tuning the laser wavelength over a wavelength range including the absorption line of the gas,
measuring intensity of laser light returned from the environment containing the gas, as a result of scattering as a function of time, and
converting the intensity vs time into gas absorption vs wavelength, and
using the gas absorption vs wavelength to determine the concentration of the gas in the target environment.

The environment containing the gas may be a test environment for the purpose of calibrating the laser lidar system, for example in a laboratory. In that case the steps of directing, tuning and measuring may be repeated "in the field" with the laser beam being directed to the target environment.

Alternatively, for example if greater accuracy is required, the environment containing the gas used to measure the intensity vs time may be the same as the target environment. In other words the target environment may itself be used for the calibration. This calibration may be performed for every gas concentration measurement or for every n measurements where n is an integer.

Below we further describe some of the foregoing embodiments and additional embodiments by way of example.

Specific Example 1

Raw Data

Spectrally tuned diode lidar tunes the laser wavelength periodically across a gas absorption line and measures the amount of light returning to the sensor. Since the tuning is periodic the amount of light returning to the sensor is parameterized by $\tau_i$ which is the 'time modulo the tuning period'. The $\tau_i$ are a number of discrete time bins indexed by the i subscript.

Typically, the laser wavelength is tuned at a rate of ~1 MHz. An output vector corresponding to the transmission vs cycle time $\tau_i$ is produced is by a spectrally tuned diode lidar generally at a rate on the order of 100 Hz. Each raw data vector consists of the amount of received photons of light $I_R(\tau_i)$ at a given time during the tuning period $\tau_i$. Example raw output spectra $I_R(\tau_i)$ is shown in FIG. 1. It should be noted that there are two dips because the laser scans twice (each tuning period) across the absorption line in one tuning period (i.e., back, and forth).

Calibrate the Laser Tuning Wavelength Vs Time

The first step in the example algorithm described here is to convert the $\tau_i$ to wavelength. In other words the laser wavelength at each time bin in the tuning cycle is estimated. Since the laser tuning is stable over long time scales this step can be carried out as an initial calibration, then checked and updated intermittently as often as is required. Essentially we the laser wavelength is determined as a function of time in the laser tuning cycle, i.e. $\lambda_i = f(\tau_i)$.

This calibration can be achieved in a number of ways, either by direct measurement of the wavelength (using an optical spectrum analyser or other well-known techniques), or by inferring it based on known molecular absorption lineshape. This provides the transmission vs wavelength, $I_R(\lambda_i)$.

One way to calibrate the laser wavelength vs time is to use the assumption that the absorption lineshape is a standard Lorentzian shape and is used in this example although Voigt or experimentally determined curves would be slightly more accurate. Numerical optimization may be used to find a function $\lambda_i = f(\tau_i)$ such that the curves in FIG. 1 closely match pure Lorentzian curves. The function $f(\tau_i)$ may be parameterised as an exponential function $\lambda_i = x_1 \exp(-x_2 t)$ (although a variety of more or less complex functions can be used). The intuition behind the choice of function is related to physical understanding of the laser output wavelength mainly being driven by thermal relaxation of the gain medium, as explained in M. Fukuda, T. Mishima, N. Nakayama, and T. Masuda, "Temperature and current coefficients of lasing wavelength in tunable diode laser spectroscopy," in Applied Physics B: Lasers and Optics, 2010, vol. 100, no. 2, doi: 10.1007/s00340-009-3878-0. The details of the curve fitting procedure are described in the "curve fitting" section later in this document. (Since this is a one off calibration a large amount of data (i.e. several minutes) can be used to increase signal to noise ratio).

Figure 2:
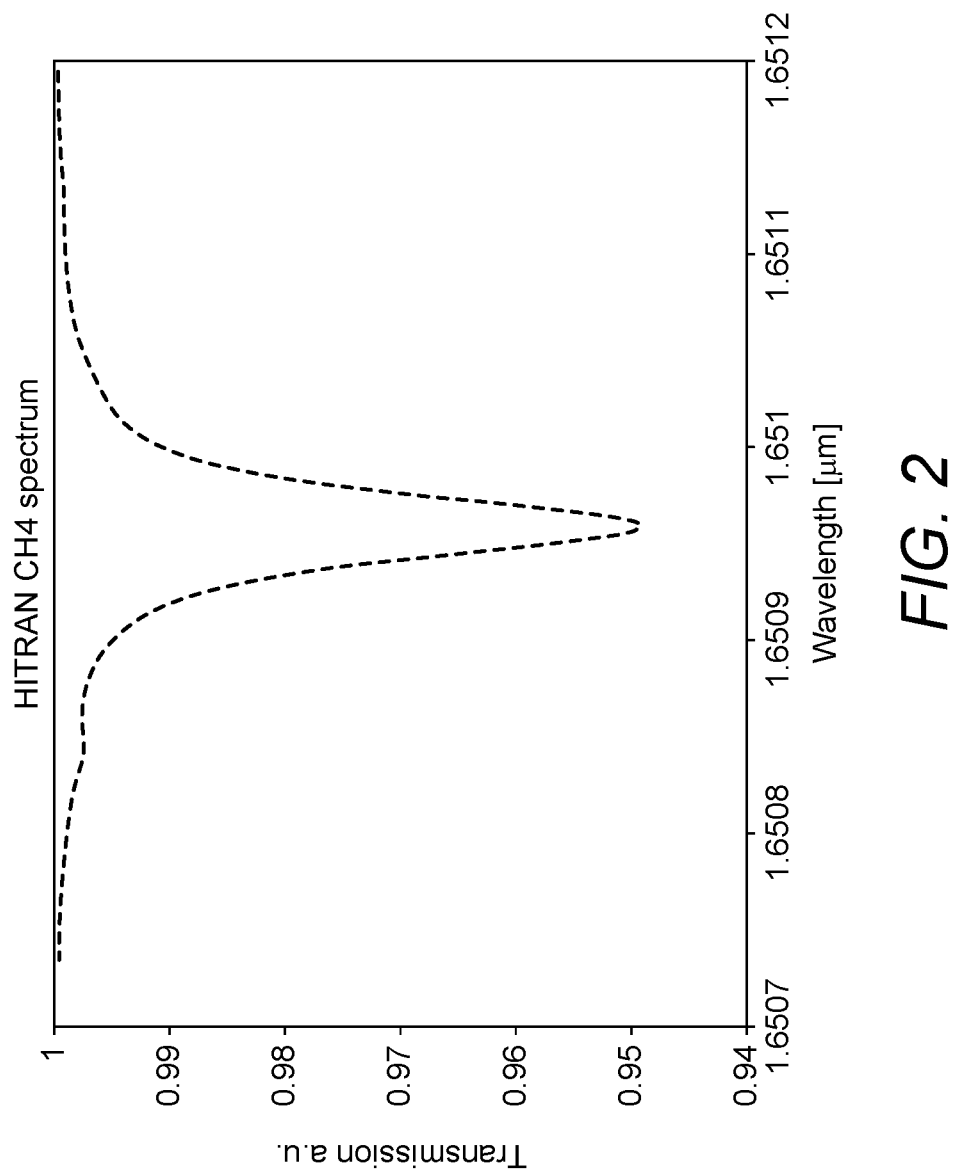
FIG. 2 is an example graph showing variation of methane absorption vs wavelength calculated numerically using a molecular absorption database.
Figure 3:
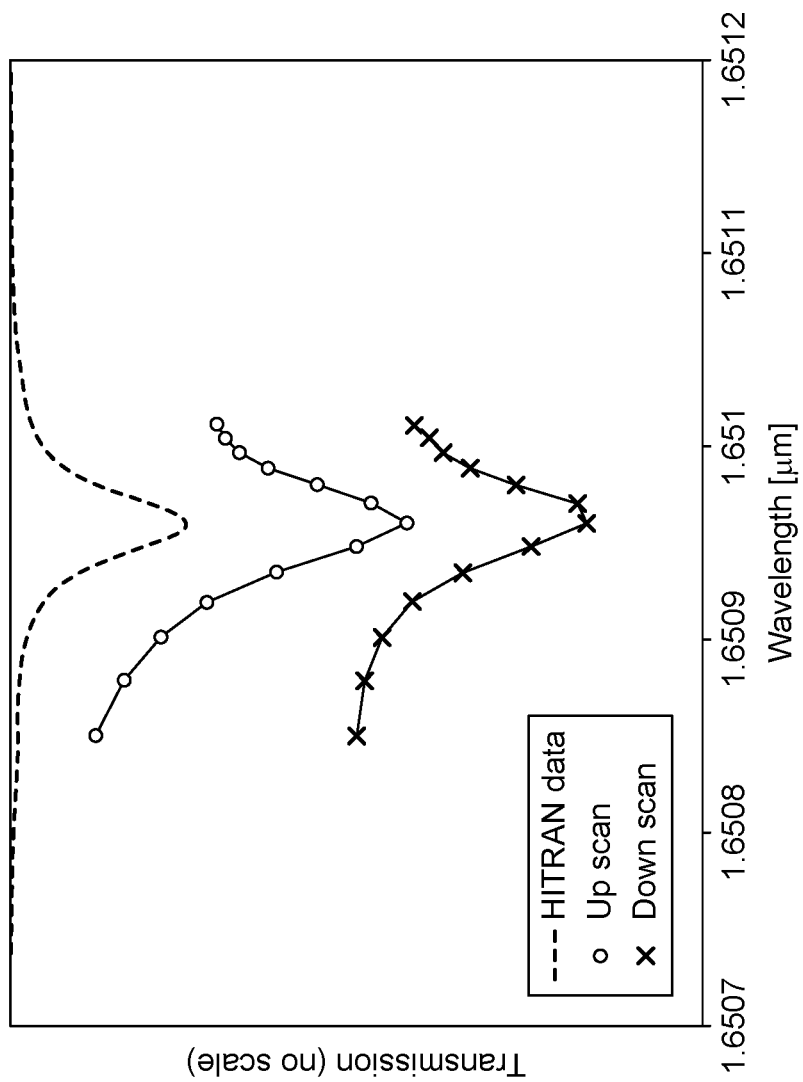
FIG. 3 is a graph showing the conversion of a laser absorption spectrum from intensity vs time to absorption vs wavelength by matching to a known shape from a molecular absorption database.

The result of finding the optimal function parameters to make the measured data match the expected Lorentzian shape is illustrated in FIG. 2 and FIG. 3. FIG. 2 shows the expected absorption vs wavelength calculated numerically from a HITRAN calculated molecular absorption database. FIG. 3 shows a rapidly tunable diode laser absorption spectrum converted from time bin ($\tau_i$) to wavelength by matching the shape to known CH4 line shape (from HITRAN database). In the figure, the HITRAN transmission is plotted alongside the up and down scans using the newly calculated wavelength axis $\lambda_i = f(\tau_i)$. With an accurate estimate of wavelength the spectroscopy Gas Concentration Path Length Estimation Once the calibrated wavelength is determined (i.e. $\lambda_i = f(\tau_i)$) the Beer-Lambert law may be used to estimate the total number of gas molecules in the laser path, also known in the art as the gas concentration path length.

The spectral transmission of the TDLiDAR laser light passing through CH4 gas is given by the Beer-Lambert law:

$$I_R(\lambda) = I_T(\lambda) e^{-2\sigma(\lambda) \cdot P}$$

Here $I_R(\lambda)$ is the returning laser spectrum, $I_T$ is the initially transmitted laser spectrum, $\sigma(\lambda)$ is the attenuation cross section of the gas as a function of wavelength, and P is the amount of gas molecules in the laser path. P can be expressed in units ppm·m (parts per million×meters), i.e. the integral of the local concentration (ppm) along the distance of the laser beam. The transmission spectra $I_R(\lambda)$ is what is measured directly by TDLiDAR sensor. To find the gas concentration path length an inverse problem must be solved to find the set of parameters $(I_T(\lambda), \sigma(\lambda))$ that produces the spectral shape that best explains the observed transmission spectra.

This optimization problem can be solved rapidly in real time by assuming a Lorentzian shaped attenuation cross section, $$\sigma(\lambda) = \frac{-2a_1}{1 + (\lambda - a_2)^2/(a_3)^2}$$

and a flat initial spectrum with some unknown gradient, $$I_T(\lambda) = \alpha_5 \cdot (\lambda a_4 + 1)$$

With these assumptions the Beer-Lambert law for the received spectrum becomes:

$$I_R(\lambda) = \exp\left(\frac{-2a_1}{1 + (\lambda - a_2)^2/(a_3)^2}\right) \cdot (\lambda a_4 + 1) \cdot a_5$$

The parameters $\alpha_4$, $\alpha_2$, $\alpha_2$ are all properties of the laser system used in the system. This means these parameters can change over time depending on the conditions (temperature, electrical noise etc.) of the system. In particular, $\alpha_5$ is proportional to the average laser output power, $a_4$ accounts for any linear slope cause by the laser driving or optical transmission wavelength dependence of the optical system. The offset of the centre of the CH4 absorption feature relative to the TDLiDAR wavelength sweeping is accounted for in $\alpha_2$, and the spectral width of the absorption feature relative to the range of the TDLiDAR wavelength sweeping is accounted for by the $\alpha_3$ parameter. All these parameters are found to vary relatively slowly compared to the data acquisition frequency of the sensor (0.01 s). This means they can be treated as slowly varying constants, with a curve fitting applied every 60 s to recalibrate these constants on the fly.

In contrast $\alpha_5$ and $\alpha_1$ depend on the external environment, and therefore can vary rapidly as the beam is scanned. $\alpha_5$ is the signal level of the return signal and changes depending on the scattering coefficient of the scattering surface that the scanner is directing the beam at. $\alpha_1$ is proportional the amount of gas molecules in the laser path (time the absorption per molecule), so naturally this also changes rapidly. Both parameters $\alpha_5$ and $\alpha_1$ are recalculated rapidly each 0.01 s using linear least squares regression. This produces a CH4 concentration data point each 0.01 s.

This can be estimated based on previous empirical measurements or numerical calculations (i.e. HITRAN database). A simple approach is to assume a Lorentzian shaped absorption cross section, however empirical data or more complex function can be used for the absorption cross section.

For the case of a Lorentzian absorption cross section $$\sigma(\lambda_i) = \frac{-cP}{1 + (\lambda_i - a_2)^2/(a_3)^2}$$

Note: the calibration and curve fitting may be completed as a single optimization procedure by parameterizing $\lambda_i$ as a function of $\tau_i$.

Finally, the Beer-Lambert law is applied to determine the gas concentration path length, based on the spectral transmission and the absorption cross section.

Specific Example 2: Matching Measured Signal to HITRAN Database

Another specific implementation of the technique is now described, this time using data from the HITRAN database to model the expected lineshape. This should produce slightly better results than matching the lineshape to a standard function such as Lorentzian or Voigt since these are only approximations. Nevertheless all of the techniques described here have practical applications depending on the required accuracy. Furthermore using HITRAN data can allow accounting for complex cases where absorption lines of multiple gases overlap forming irregular shapes.

Figure 4:
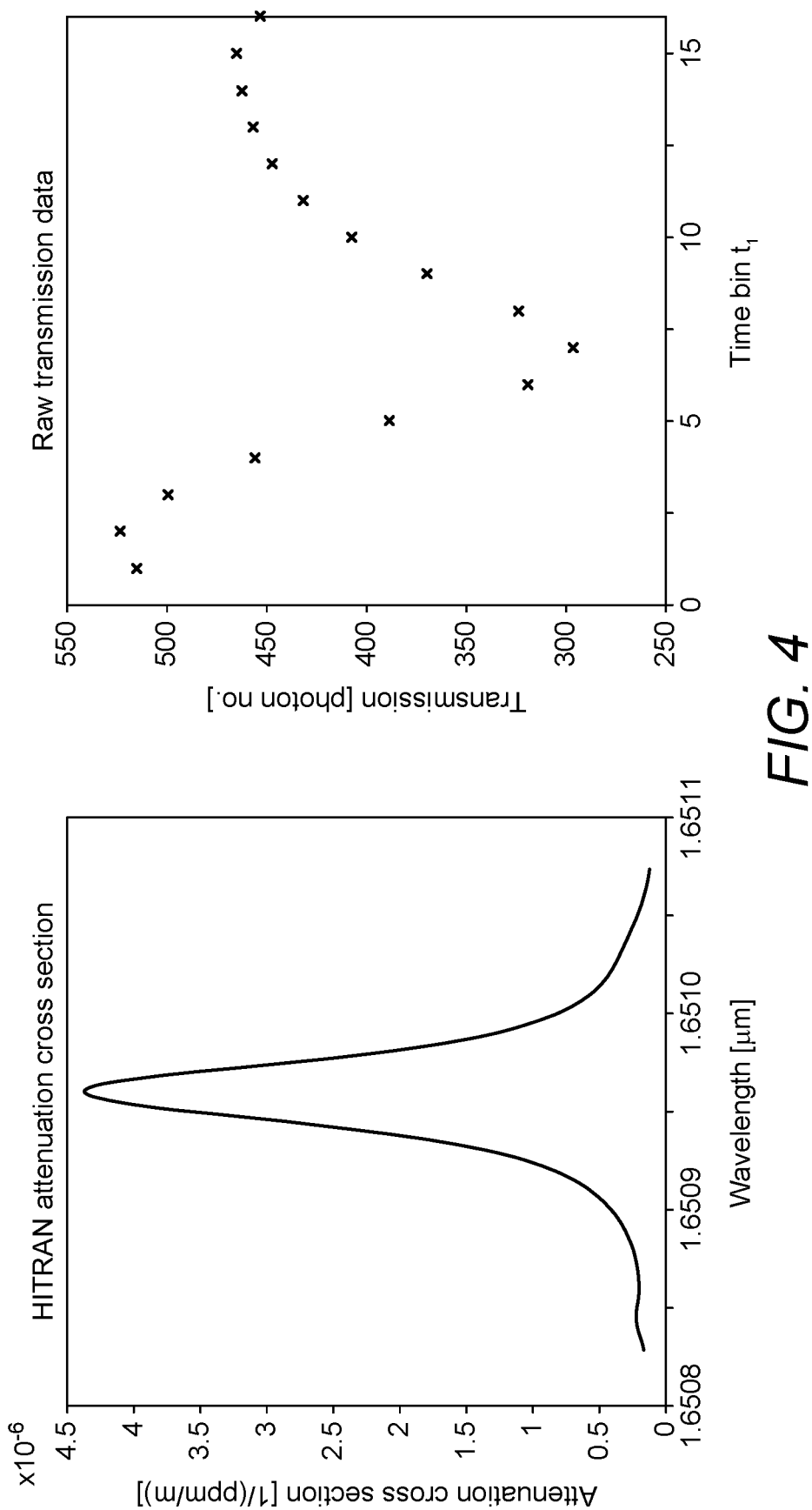
FIG. 4 shows two graphs comparing attenuation from a molecular absorption database to raw sensor data.

An example method for doing this is as follows:

First the attenuation cross section of the target gas absorption line is acquired from HITRAN or other reliable source. This is a 1D data set ($\lambda$, $\sigma$) where $\lambda$ is the light wavelength and $\sigma$ is the gases attenuation cross section at that wavelength. Typically, the data set would contain 100 or more data points at wavelengths around the absorption line of interest. The width of the absorption line would typically around 0.5 nm. An example of the HITRAN attenuation cross section for a specific absorption line (CH4 @1651 nm) is shown in the left panel of FIG. 4. The raw sensor data is shown on the right.

Next the raw data from the sensor is acquired. Since this is an initial calibration procedure that does not need to produce real time results the data can be acquired over several minutes to increase signal to noise ratio. The raw data is denoted $I_R(\tau_i)$, and shows light signal transmission at different time windows ($\tau_i$) during the laser tuning cycle. An example of the raw sensor data is shown in the right-hand panel of FIG. 4. The challenge is now to match the $I_R(\tau_i)$ to the HITRAN data set.

Instrument Function

A computer function called here the 'instrument function', is used to simulate the measurement process of the sensor. The instrument function takes the scientific ground truth of the HITRAN attenuation data ($\lambda$, $\sigma$) and produces the expected light signal received by the sensor for a given a set of measurement parameters. Given the correct choice of the parameters the instrument function closely reproduces the measurement data. The measurement parameters used in this example are:

$\alpha_0$: Laser wavelength at start of tuning cycle
$\alpha_1$: Thermal tuning constant of laser
$\alpha_2$: Magnitude of laser tuning
$\alpha_3$: Spectral slope of transmitted light
$\alpha_4$: Intensity of returned light (without absorption by attenuating gas)
$\alpha_5$: Concentration path length of gas species (ppm·m)

The first 3 parameters $\alpha_{0-2}$ are related to the conversion between laser wavelength $\lambda_i$ and sensor time bin $\tau_i$. The final 3 parameters are related to the transmission of the light from the laser, through the environment and back to the sensor.

The instrument function has two stages as follows:

1. Convert time bin no. to wavelength: To find the laser wavelength we assume an inverse exponential relation between time and the laser wavelength. The laser wavelength at each time bin is estimated as:

$$\lambda(\tau_i) = \alpha_0 - \alpha_1 \exp(-\tau_i \alpha_2)$$ a.

Note that other more complex functions may be used in place of the inverse exponential.

2. Convert attenuation cross section to transmission spectrum: Once the wavelength in each time bin is known ($\lambda(\tau_i)$), the beer lambert law can be used with the HITRAN attenuation cross section to get the light transmission. Note that the HITRAN data is discrete, thus for a given $\lambda(\tau_i)$ there may be no data point in the HITRAN data corresponding exactly to that wavelength. To overcome this we simply use interpolation between the points of the high resolution HITRAN data to estimate the attenuation cross section at any wavelength in the range. We denote this interpolated estimate of the attenuation cross section $f_\sigma$, so the interpolated HITRAN value of interest at wavelength $\lambda(\tau_i)$ is denoted $f_\sigma(\lambda(\tau_i))$.

The instrument function uses the beer lambert law to simulate the measurement data result according to:

$$T(\tau_i, \alpha) = (a_3(\lambda(\tau_i) - \lambda_0) + a_4) \exp[-f_\sigma(\lambda(\tau_i))\alpha_5]$$

Here the term involving $a_3$ and $a_4$ is the linear properties of the return spectrum. $\lambda_0$ is the initial wavelength of the HITRAN data set, its purpose here is to scale simply as parameter normalization. The exponential term is the beer lambert law.

Optimization of Measurement Parameters

The input parameters to the instrument function ($\alpha_{1-5}$) are optimized to minimize the difference between the measured raw data and the predicted measurement values from the instrument function.

The error signal is defined as:

$$\epsilon = \Sigma_i |I_R(\tau_i) - T(\tau_i, \alpha)|^2$$

Where $I_R(\tau_i)$ is the raw data and $T(\tau_i, \alpha)$ is the instrument function output.

Figure 5:
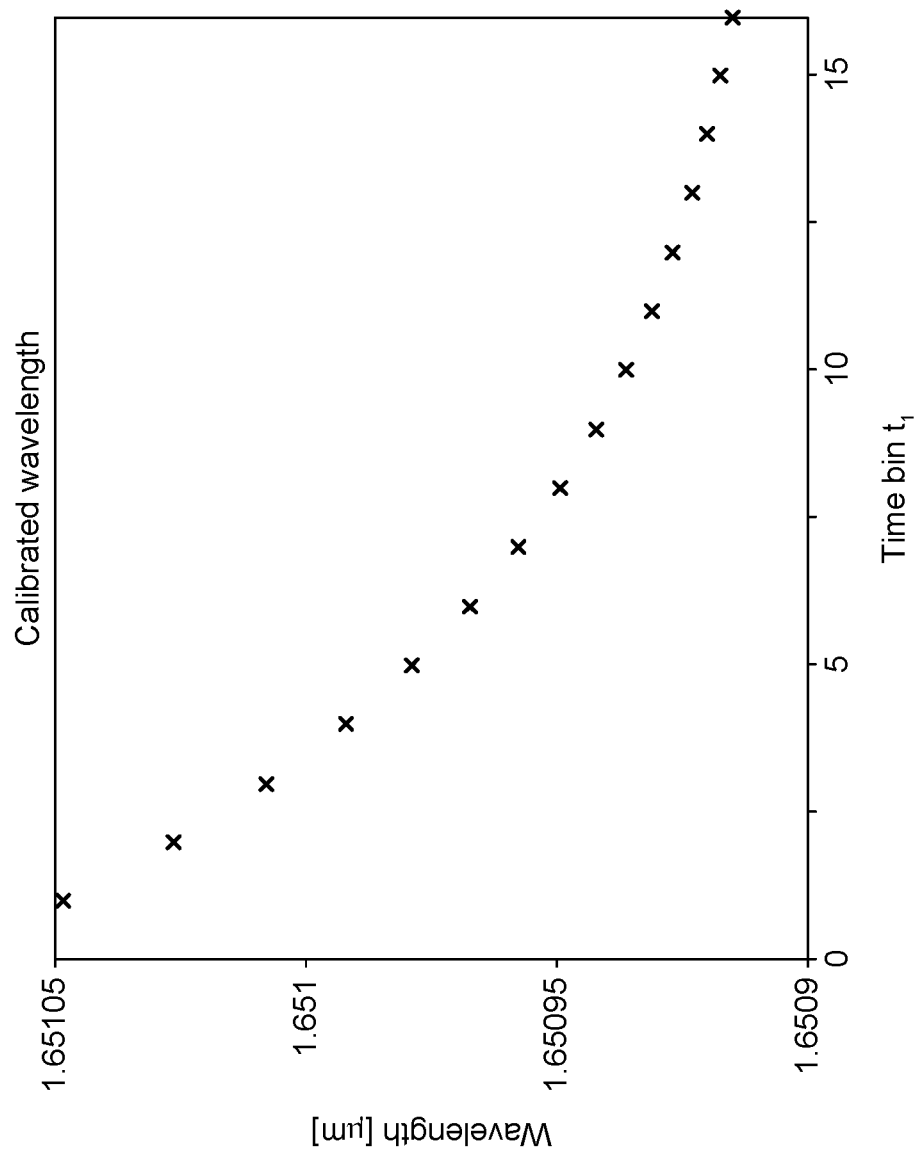
FIG. 5 is a graph showing a sensor wavelength vs time bin.

A numerical optimization function is used to minimize $\epsilon$ as a function of $\alpha$, and thus find the measurement parameters that best explain the measurement result. Once the optimal values of parameters $\alpha_{0-5}$ are found we have a significant amount of calibration information about the sensor system. $\alpha_{0-2}$ give an estimate of the laser wavelength vs time bin $\lambda(\tau_i)$, as shown in FIG. 5. This figure shows the sensor wavelength vs time bin, determined via numerical optimisation of the instrument function. Thus the wavelength of the spectrometer is effectively calibrated through this process.

Figure 6:
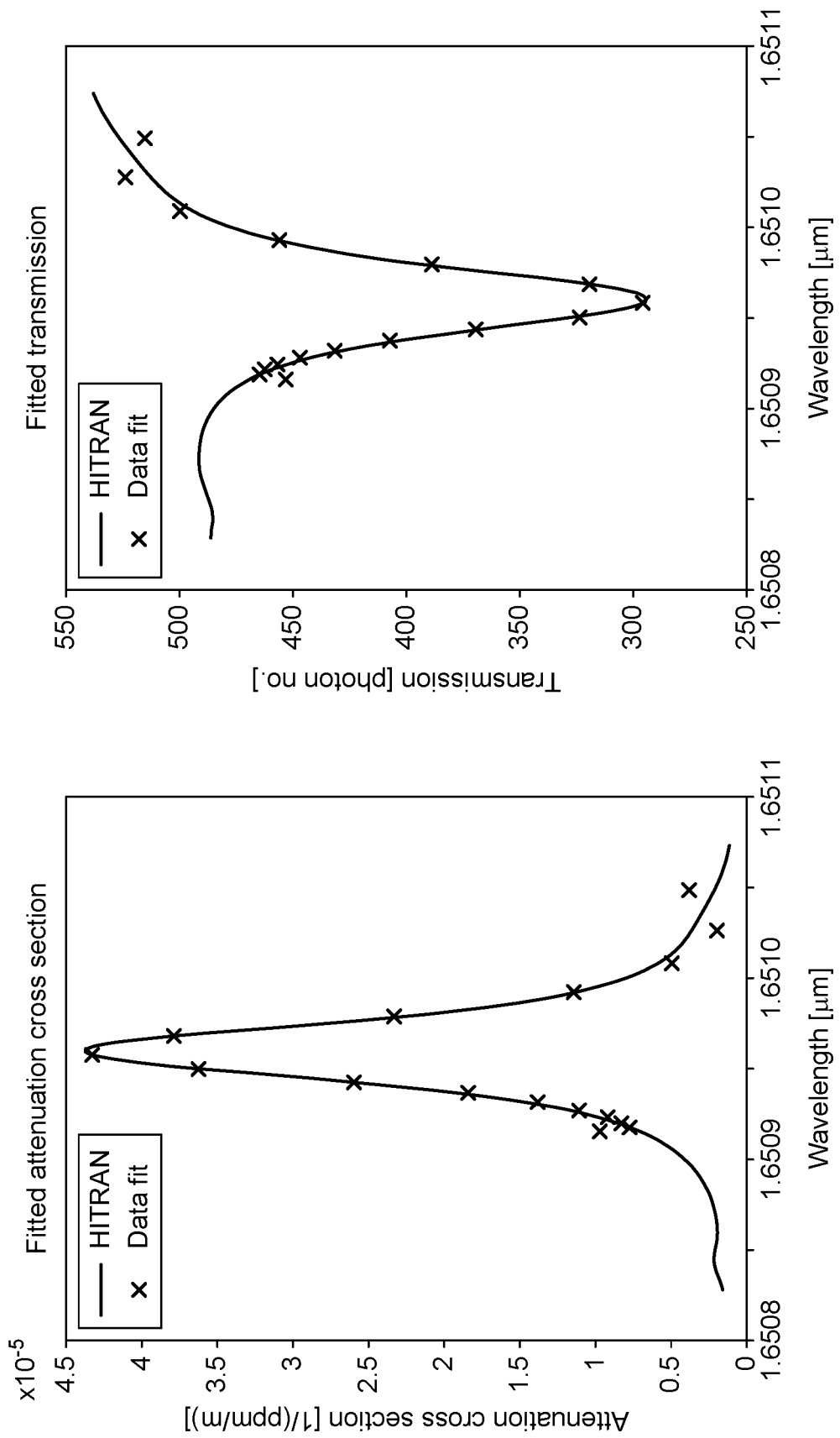
FIG. 6 shows on the left attenuation raw data fitted to a shape from a molecular absorption database and on the right the output of an instrument function optimised to match sensor data.

FIG. 6 shows measurement results fitted to HITRAN data. The graph to the left shows the HITRAN attenuation cross section with the raw data. The graph to the right shows the output of the instrument function (black line) optimized to match the sensor data (crosses). The optimization of the instrument function parameters also gives the information about the amplitude, slope and gas absorption in the spectrum. This allows one to accurately plot the spectral transmission vs wavelength, as shown in the right hand plot of FIG. 6. Here the black line is the transmission estimated by the instrument function, while the crosses are the raw measurement data used for the optimization/calibration.

The left hand plot of FIG. 6 is similar to the right hand plot, but instead of showing the transmission of light it shows the attenuation cross section as a function of wavelength. The black line is the attenuation cross section data taken directly from HITRAN, i.e. $\sigma(\lambda)$. The crosses are the raw measurement data, but transformed from transmission to attenuation cross section using the instrument function equation in reverse.

This method allows one to accurately calibrate the wavelength and other measurement parameters of a rapidly tunable diode lidar gas sensor.

Following this calibration a similar algorithm may be used for real time measurements. Here the goal would be to predict the gas concentration path length (parameter $\alpha_5$) rapidly in real time (i.e. 100 Hz). The optimization can be simplified since certain instrument parameters are constant over long time scales. $\alpha_{0-3}$ are likely to remain constant for a long time, so do not need to be optimized for during real time measurements. $\alpha_{4-5}$ relate to the external environment so both change as the sensor scans around the environment and thus need to be optimized rapidly to estimate the gas concentration path length in real time.

Additional Details

Figure 7:
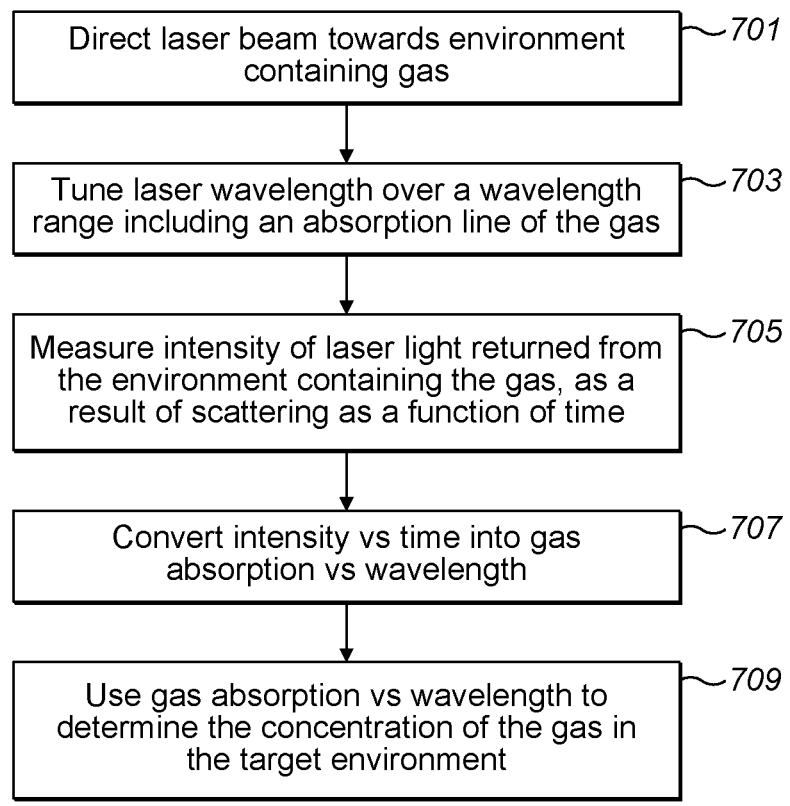
FIG. 7 is a flowchart showing a method of measuring the concentration of a gas in a target environment.
Figure 8:
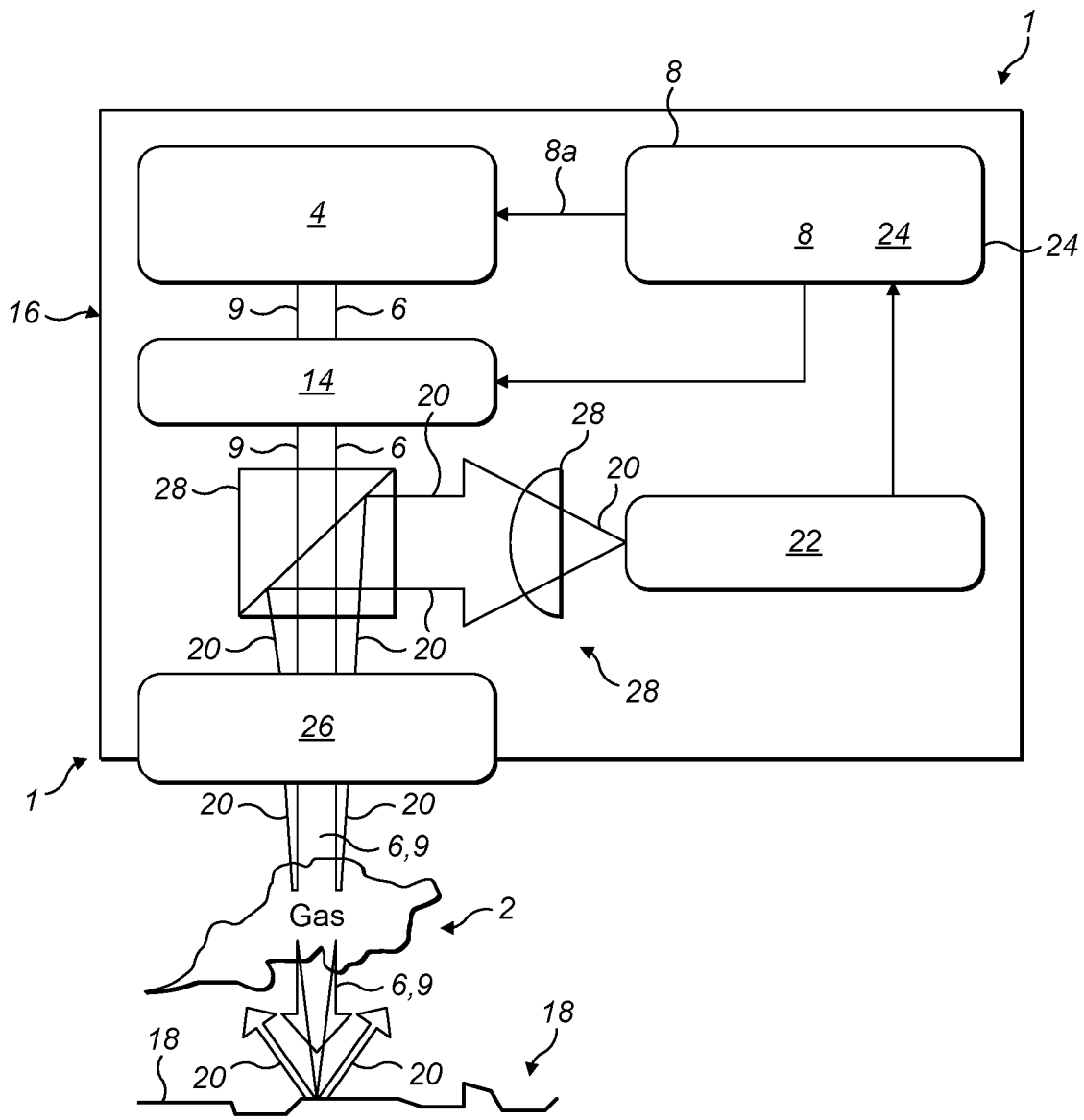
FIG. 8 is a schematic diagram of a lidar gas detection system in which any of the methods described herein may be implemented.

FIG. 7 is a flow chart showing an example of a method of method of measuring the concentration of a gas in a target environment, which may be performed using a laser lidar system for example as described in GB2586075A and shown schematically in FIG. 8.

The method begins at operation 701 with directing a laser beam towards an environment containing gas, e.g. an environment in which a particular gas is suspected to be present. Then at operation 703 the laser wavelength is tuned over a wavelength range including an absorption line of the gas. As is known in the art, where the gas has more than one absorption line the strongest may be chosen. For gases with more than one absorption line the wavelength range may include more than one absorption line of the gas or more than one wavelength range may be used.

At operation 705 the intensity of laser light, returned from the environment as a result of scattering, is measured as a function of time. At operation 707 the intensity vs time is converted into gas absorption vs wavelength, as described above. The gas absorption vs. wavelength may then be used to determine the concentration of gas in the target environment as described above.

The method shown in FIG. 7 may be performed using any suitable laser lidar system.

An example of a rapidly tunable diode lidar which may be used to implement the method of FIG. 7 is described in GB2586075A. FIG. 8 is a schematic diagram of a lidar gas detection system as described in more detail in GB2586075A.

As shown in FIG. 8, the gas detection system 1 is a gas detection device configured to detect the presence or concentration of at least one gas 2.

The gas detection system 1 includes a laser device 4 operable to output first output radiation 6 having a continuous wave output. The gas detection system 1 includes a control element 8 operable to tune a first emission wavelength 9 of the first output radiation 6 continuously within a first wavelength spectrum which includes an absorption line of the gas.

The control element 8 is operable to continuously tune the first emission wavelength 9 within the first wavelength spectrum and to perform multiple scans within the first wavelength spectrum. In this arrangement, the gas detection system 1 is operable to continuously vary the first wavelength spectrum, such that the emission wavelength 9 varies continuously over time. A gas may then be detected based on its characteristic transmission or absorption spectrum.

As shown in FIG. 8, the gas detection system 1 includes a modulator 14 operable to apply a first output modulation to the first output radiation 6.

The gas detection system 1 includes an optical system 26 operable to transmit the first output radiation 6 towards a first target location or environment 18 and to collect/receive scattered radiation 20, the scattered radiation 20 having been at least partially modified by the gas 2 present in the first target environment 18.

The gas detection system 1 includes a detector 22 configured to receive the scattered radiation 20 and a processing element 24 operable to process the received scattered radiation 20. The gas detection system 1 may be configured to detect the presence, or concentration, of the gas 2 in the atmosphere.

The gas detection system 1 may be configured to detect the presence, or concentration, of the gas 2 when located remote from the gas detection system 1, at a distance of up to approximately 100 meters. However, it should be appreciated that the gas detection system 1 could be configured to detect the gas 2 at other distances. For example, the gas detection system 1 could be mounted to a satellite and configured to operate at distances of up to 100 km or more. Furthermore, the gas detection system could be configured to detect gas located within the gas detection system 1.

A noted above, in an example implementation the gas detection system 1 may be configured to detect methane (CH4), although the gas detection system 1 could be configured to detect one or more gases.

The gas detection system 1 may be operable to output the first output radiation 6 in the infrared region of the electromagnetic spectrum, specifically at a wavelength of between approximately 1.6506 pm and 1.6512 pm. However, in other embodiments the gas detection system 1 could be operable to output the first output radiation 6 in one or more regions of the electromagnetic spectrum.

The first output radiation 6 may comprise a continuous wave (CW) output and the modulator 14 may be operable to apply a first output random or quasi-random modulation (RM) (an example of first output modulation 16) to the first output radiation 6. In this arrangement, the gas detection system 1 is a CWRM device.

As shown in FIG. 8, the gas detection system 1 may comprise a single laser device 4, and the emission wavelength 9 is continuously tuned within the wavelength spectrum 10, such that this single laser device 4 is used to generate both the "on" wavelength(s) and the "off" wavelength(s). That is, the gas detection system 1 may not require a plurality of laser devices 4 to scan the wavelength spectrum 10. It will be appreciated that in other embodiments, the gas detection system 1 could comprise a plurality of laser devices 4, used to scan multiple wavelength spectra 10 or, in some embodiments, to use more than one laser device 4 to scan within a particular wavelength spectrum 10 (e.g. using one laser device 4 to emit an "off" wavelength and another laser device 4 to emit an "on" wavelength).

In the embodiments illustrated and described here, the gas detection system 1 includes a single optical system 26 operable to transmit the first output radiation 6 and to receive the scattered radiation 20. The optical system 26 may comprise a pair of prisms which may be driven, e.g. rotated, in manners described further below, to scan the laser beam 20 across a system field of view. The gas detection system 1 may be configured to be mountable to a frame member, a vehicle, an aerial vehicle, and/or an unmanned vehicle, an unmanned aerial vehicle, and/or a helicopter. As shown in FIG. 8, the gas detection system 1 includes one or more optical guide elements 28 configured to guide the received scattered radiation 20 to the, or each, detector 22.

The laser device 4 may be a tuneable laser device 4. In the embodiment illustrated in FIG. 8, the first emission wavelength 9 of the laser device 4 is tuneable by adjusting, or modulating, the drive current of the laser device 4, which in this embodiment is controlled by the control element 8 sending a drive current modulation 8a to the laser device 4. It will be appreciated that in some embodiments, the laser drive current could be provided directly from the control element 8, or via ancillary drive circuitry.

The processing element 24 may comprise a computing system as is known in the art comprising memory and one or more processors and therefore some or all of operations 705, 707, 709 may be performed in the processing element 24 to determine the concentration of gas 2 in the environment 18. In some embodiments of the present invention, the methods and/or algorithms described herein may be implemented by suitable configuration of a computing system in an existing device, e.g. an existing gas lidar detection system, by the provision of suitable computer readable media. In other embodiments, measurement results may be received at a computing system from a laser lidar device and processed to determine gas concentration path.

A system or device suitable for implementing any of the methods or systems described here may comprise one or more processors which may be microprocessors, controllers or any other suitable type of processors for processing computer executable instructions to control the operation of the device in order to gather and record routing information, as is known in the art. In some examples, for example where a system on a chip architecture is used, the processors may include one or more fixed function blocks (also referred to as accelerators) which implement a part of the method in hardware (rather than software or firmware). Platform software comprising an operating system or any other suitable platform software may be provided at the computing-based device to enable application software to be executed on the device.

Various functions described herein can be implemented in hardware, software, or any combination thereof. If implemented in software, the functions can be stored on or transmitted over as one or more instructions or code on a computer readable medium. Computer-readable media may include, for example, computer readable storage media. Computer readable storage media may include volatile or non-volatile, removable or non-removable media implemented in any method or technology for storage of information such as computer readable instructions, data structures, program modules or other data. A computer readable storage medium can be any available storage medium that may be accessed by a computer. By way of example, and not limitation, such a computer readable storage medium may comprise a RAM, a ROM, an EEPROM, a flash memory or other memory device, a CD-ROM or other optical disc storage, a magnetic disc storage or other magnetic storage device, or any other medium that can be used to carry or store desired program code in the form of instructions or data structures and that can be accessed by a computer. A computer readable storage medium and/or computer readable storage media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, or in addition, the functionality described herein can be performed, at least in part, by one or more hardware logic components. For example, and without limitation, hardware logic components that can be used may include Field-programmable Gate Arrays ("FPGAs"), Program-specific Integrated Circuits ("ASICs"), Program-specific Standard Products ("ASSPs"), System-on-a-chip systems ("SOCs"). Complex Programmable Logic Devices ("CPLDs"), etc.

Although illustrated as a single system, it is to be understood that a computing device or system suitable for implementing any of the systems and methods described here may be a distributed system. Thus, for instance, several devices may be in communication by way of a network connection and may collectively perform tasks described as being performed by the computing device.

It will be appreciated that a computing device as described here may be located remotely and accessed via a network or other communication link (for example using a communication interface).

The term 'computer' "computer" is used herein to refer to any device with processing capability such that it can execute instructions. Those skilled in the art will realise that such processing capabilities are incorporated into many different devices and therefore the term 'computer' "computer" includes PCs, servers, mobile telephones, personal digital assistants and many other devices.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

While the methods are shown and described herein may be series of acts that are performed in a particular sequence, it is to be understood and appreciated that the methods are not limited by the order of the sequence. For example, some acts can occur in a different order than what is described herein. In addition, an act can occur concurrently with another act. Further, in some instances, not all acts may be required to implement a method described herein.

It will be understood that the above description is given by way of example only and that various modifications may be made by those skilled in the art. What has been described above includes examples of one or more embodiments. It is, of course, not possible to describe every conceivable modification and alteration of the above devices or methods for purposes of describing the aforementioned embodiments, but one of ordinary skill in the art can recognize that many further modifications and permutations of various embodiments are possible. Accordingly, while one or more embodiments of the invention have been illustrated and described in detail in the drawings and foregoing description, the same is to be considered as illustrative and not restrictive in character, it being understood that only certain embodiments have been shown and described and that all changes and modifications that come within the spirit of the inventions are desired to be protected.

One or more of the features of the appended claims may be implemented in any combination in order to implement an embodiment of the invention.

It is not a requirement of any embodiment of the invention, unless otherwise stated, to perform the steps of the method in a particular order.

The invention claimed is:

1. A method of measuring the concentration of a gas in a target environment using a laser lidar system, the method comprising:
   directing a laser beam towards a target environment containing the gas;
   tuning the laser wavelength over a wavelength range including an absorption line of the gas;
   measuring intensity of laser light, returned from the environment containing the gas as a result of scattering, as a function of time;
   converting the intensity vs time into gas absorption vs wavelength; and
   using the gas absorption vs wavelength to determine the concentration of the gas in the target environment,
   wherein the variation of wavelength with time during the tuning period is non-linear.

2. The method of claim 1, wherein the tuning of the laser beam takes place periodically with a frequency of at least 90 KHz, optionally at least 1 MHz.

3. The method of claim 1, wherein the converting comprises matching the intensity vs time to a model of the expected intensity for the gas.

4. The method of claim 3, wherein the model is obtained by direct measurement of the wavelength vs time.

5. The method of claim 4, wherein a HiTRAN (high-resolution transmission molecular absorption) data base is used for the measurements.

6. The method of claim 3, wherein the model is based on known molecular absorption characteristics of the gas.

7. The method of claim 3, wherein the model is based on an approximation function based on knowledge of laser response to current driving.

8. The method of claim 3, wherein the model uses approximations for standard lineshapes including one or more of Lorentzian and Voigt lineshapes.

9. The method of claim 1, wherein the gas concentration vs wavelength is determined using the Beer-Lambert law to estimate the total number of gas molecules in the laser path.

10. The method of claim 1, wherein the environment containing the gas is a different environment from the target environment and the steps of directing, tuning and measuring are repeated on the target environment in order to determine the gas concentration.

11. The method of claim 1, wherein the environment containing the gas is the same as the target environment.

12. A non-transitory computer readable storage medium comprising instructions which, when implemented in a computing system, cause the system to perform a method of determining gas concentration in an environment, the method comprising:

receiving signals representing intensity of laser light returned from the environment as a function of time as a result of scattering laser light directed at the environment tuned over a wavelength range including the absorption line of the gas;

converting the intensity vs time into gas absorption vs wavelength; and using the gas absorption to determine the gas concentration path vs wavelength, wherein the variation of wavelength with time during the tuning period is non-linear.

13. A lidar gas detection system, comprising:

a laser device configured to emit laser radiation tuned over a wavelength range including an absorption line of a particular gas;

an optical system configured to direct radiation from the laser device towards a target environment; and one or more processing elements configured to:

measure the intensity of laser light, returned from the environment containing the gas as a result of scattering, as a function of time, convert the intensity vs time into gas absorption vs wavelength, and use the gas absorption vs wavelength determine the concentration of the gas in the target environment, wherein the variation of wavelength with time during the tuning period is non-linear.

* * * * *